US007321371B2

(12) United States Patent
Sawabe

(10) Patent No.: US 7,321,371 B2

(45) Date of Patent: Jan. 22, 2008

(54) DATA CONVERSION DEVICE

(75) Inventor: Daiichi Sawabe, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 11/175,277

(22) Filed: Jul. 7, 2005

(65) Prior Publication Data

US 2006/0008158 A1 Jan. 12, 2006

(30) Foreign Application Priority Data

Jul. 8, 2004 (JP) ............................ 2004-202099
Jun. 9, 2005 (JP) ............................ 2005-170155

(51) Int. Cl.

*G06K 9/36* (2006.01)
*G06K 9/46* (2006.01)
*G09G 5/00* (2006.01)
*G09G 5/02* (2006.01)
*G06T 9/00* (2006.01)
*H04N 11/04* (2006.01)
*H04N 5/445* (2006.01)
*G06K 5/54* (2006.01)

(52) U.S. Cl. ...................... 345/606; 345/600; 345/639; 345/547; 345/555; 348/459; 348/567; 348/568; 382/232; 382/235; 382/247; 382/305

(58) Field of Classification Search ........ 345/589–592, 345/600–606, 616–618, 639, 643, 692, 543–549, 345/555, 567; 348/390–396, 412–414, 430, 348/456, 459, 466, 513–526, 567–568; 382/232–236, 382/247–248, 305; 358/523–525

See application file for complete search history.

(56) References Cited

U.S. PATENT DOCUMENTS 5,661,823 A * 8/1997 Yamauchi et al. .......... 382/239
2002/0097252 A1 7/2002 Hirohata
2003/0091112 A1 5/2003 Chen
2003/0122854 A1 7/2003 Ooishi et al.
2003/0210347 A1* 11/2003 Kondo ........................ 348/383
2005/0237316 A1* 10/2005 Huang et al. ............... 345/204

FOREIGN PATENT DOCUMENTS

| | | | |
|---|---|---|---|
| JP | 63-25556 B2 | 5/1988 |
| JP | 3167351 B2 | 3/2001 |
| JP | 2003-167555 A | 6/2003 |
| WO | WO 02/091282 | 11/2002 |

* cited by examiner

*Primary Examiner*—Wesner Sajous
(74) *Attorney, Agent, or Firm*—Harness, Dickey & Pierce, P.L.C.

(57) ABSTRACT

The data conversion device of the present invention includes: a coding section for replacing (i) one or more components constituting the display data of each pixel and other one or more components constituting display data of a pixel existing around that pixel on a screen with (ii) one or more average values of both the components so as to reduce an amount of data; and a decoding section for reading out compressed data from a frame memory and then allotting the average value as display data for each corresponding pixel. Therefore, unlike a case of adopting a conventional general data compression method, the data conversion device of the present invention can prevent deviation between original display data and display data obtained by a compression/restoration process from becoming large. Further, the data conversion device of the present invention can suppress the capacity of a necessary frame memory by compression (reduction) of data, and at the same time suppress a decrease in display quality due to the compression (reduction) of data.

11 Claims, 4 Drawing Sheets

DATA CONVERSION DEVICE

This non-provisional application claims priority under 35 U.S.C. § 119(a) on Patent Applications No. 202099/2004 filed in Japan on Jul. 8, 2004 and No. 170155/2005 filed in Japan on Jun. 9, 2005, the entire contents of which are hereby incorporated by reference.

FIELD OF THE INVENTION

The present invention relates to a data conversion device that can be used for compressing display data of a display device.

BACKGROUND OF THE INVENTION

A display device displays an image according to display data given by an external system. However, in order to improve a displaying ability of the display device, a data conversion device for converting data may be provided between the external system and the display device.

An example of the improvement in the displaying ability, which is the purpose of such a data conversion process, is an improvement in response speed of a liquid crystal display device. As for most of liquid crystal display devices, the response speed is in a range of 10 ms to 30 ms in a case where a display condition changes from black to white or from white to black, and it is in a range of about 100 ms to 200 ms in a case where a display condition slowly changes from a half tone to a half tone. A frame frequency used in normal display is 50 Hz through 60 Hz, and therefore one cycle is 16.7 ms through 20.0 ms. Because the response speed is longer than the cycle of a single frame, transcription of display is not entirely carried out when a moving image such as a television is displayed, so that an after-image is generated.

An example of countermeasure against the problem is a data conversion process disclosed in Japanese Examined Patent Publication No. 25556/1988 (Tokukoushou 63-25556) (published date; May 25, 1988) and Publication of Patent No. 3167351 (Tokkyo 3167351) (published date; May 21, 2001). Such a data conversion process is referred to as overdrive mode driving or overshoot mode driving. Hereinafter, the data conversion process is referred to merely as overdrive mode driving.

Each of these processes uses a frame memory so as to perform a data conversion process between frames. This frame memory has a large hardware size. In order to minify the hardware size, Japanese Laid-Open Patent Publication No. 167555/2003 (Tokukai 2003-167555) (published date; Jun. 13, 2003) discloses a process for reducing the hardware size by compressing and coding data before writing it in a frame memory.

However, in case of simply compressing frame data, this results in a serious decrease in display quality. As for normal image information, as described in Japanese Laid-Open Patent Publication 167555/2003, when RGB data each of which is 8 bits are made into data as R of 5 bits, G of 6 bits, and B of 5 bits, only simple quantization error occurs. But in a case of the data conversion process between frames, when RGB data each of which is 8 bits are compressed into data as R of 5 bits, G of 6 bits, and B of 5 bits, then changed into RGB data each of which is 8 bits again and made into data of a previous frame, and the data conversion process between frames is performed using the data as a reference, a complicated quantization error may occur. This is because (1) as for the response speed of crystal liquid, response time becomes nonlinear due to combination of luminance at a beginning of a change and luminance at an end of the change, so that information of a previous frame becomes physically large; and (2) in a case of a simple quantization error, it merely seems to human eyes that color has become lighter, but in a case when sub pixels of red, green and blue which make up a pixel respectively change with multiple vectors, changes of the sub pixels are likely to be seen by human eyes, so that the error becomes complicated. Therefore, in a case of the overdrive mode driving, the correction amount must be increased in a specific combination of luminance at a beginning of a change and luminance at an end of the change. Thus, even when the RGB data are compressed into 6-bit R data, 8-bit G data, and 6-bit B data, let alone 5-bit R data, 6-bit G data, and 5-bit B data, a problem of being seen by human eyes, such as being seen with additional colors, occurs. This is a logical conclusion as follows. Namely, the reason this problem occurs is that the overdrive mode driving uses a method for improving the response speed by further changing, over an original change, a part whose response speed is lower than a change between black and white like a change from a half tone to a half tone. Thus, a shift of an original value is apt to be seen by human eyes, as explained above. In the case of Japanese Laid-Open Patent Publication 167555/2003, data is further thinned out from here, so that a worse effect is brought about.

SUMMARY OF THE INVENTION

It is an object of the present invention to provide a data conversion device which can suppress the capacity of a necessary frame memory by compressing data and at the same time suppress a decrease in display quality due to the compression of data, when a data conversion device for converting data is disposed between an external system and a display device so as to improve a displaying ability of the display device and when a frame memory is needed for the data conversion process.

In order to achieve the object, the data conversion device according to the present invention performs a data conversion process for causing a frame memory to memorize display data of a past frame and for causing a data conversion section to generate calculation data serving as display data of a frame after the past frame on a basis of the display data of the past frame and display data of a present frame, so as to output as output display data the calculation data to a display device, including: a compressing section for outputting compressed data to be memorized in the frame memory for each frame, the compressed data having been subjected to a compression process by replacing (i) one or more components constituting the display data of each pixel and other one or more components constituting display data of a pixel existing around that pixel on a screen with (ii) one or more alternative values calculated by adding the one or more components and the other one or more components to each other after these components have been weighted so as to reduce an amount of data; and a restoring section for outputting restored data to the data conversion section so that the restored data is to be converted, the restored data having been subjected to a restoration process by reading out the compressed data from the frame memory and allotting the alternative value as display data for each corresponding pixel.

With the arrangement, the compression process is performed for each frame by replacing (i) one or more components constituting the display data of each pixel and other one or more components constituting display data of a pixel existing around that pixel on a screen with (ii) one or more alternative values calculated by adding the one or more components and the other one or more components to each other after these components have been weighted so as to reduce the amount of data, and the compression data is stored in the frame memory. Thereafter, the compressed data is read out from the frame memory, and a restoration process for allotting the alternative value as display data for each corresponding pixel is performed, and the display data is outputted to the data conversion section so as to be processed in the data conversion process.

Therefore, unlike the case of adopting a conventional general data compression method, deviation between original display data and display data obtained by compression and restoration process can be reduced, so that the display data is less apt to deviate from the original value, even when overshoot mode driving or overdrive mode driving is adopted. Further, this arrangement uses a conversion value which is calculated in accordance with an average between luminance of each pixel and luminance of a pixel existing around that pixel so that human eyes hardly recognize the deviation, so that it is difficult for human eyes to sense the reduction of data.

As a result, it is possible to suppress the capacity of a necessary frame memory by compressing (reducing) data and at the same time suppress the decrease in display quality due to the compression of data.

Further, in addition to the arrangement, in the data conversion device according to the present invention, the calculation data is the output display data of the present frame.

With the arrangement, the calculation data is the output display data of the present frame. Therefore, in addition to the effect of the foregoing arrangement, an image of the present frame is easily displayed.

Further, in addition to the arrangement, in the data conversion device according to the present invention, the alternative value is an average value between the component of each pixel and the other component of the pixel existing around that pixel on the screen.

With the arrangement, the alternative value is an average value of the two components.

Therefore, in addition to the effect of the foregoing arrangement, the data conversion device according to the present invention can obtain a high compression ratio while suppressing the decrease in display quality.

Further, in addition to the arrangement, in the data conversion device according to the present invention, the components are respectively luminance Y, red color difference Cr, and blue color difference Cb, and the data conversion section replaces the red color difference Cr and the blue color difference Cb respectively with the alternative values.

With the arrangement, the components are respectively luminance Y, red color difference Cr, and blue color difference Cb, and the Cr and the Cb are replaced respectively with the alternative values.

Therefore, in addition to the effect of the arrangement, the data conversion device according to the present invention can obtain a high compression ratio while suppressing the decrease in display quality, without realizing a high-definition module, compared with the case of RGB.

Further, in addition to the arrangement, in the data conversion device according to the present invention, the components are respectively RGB, and the data conversion section replaces R and B respectively with the alternative values.

With the arrangement, the components are respectively RGB, and R and B are replaced respectively with the alternative values.

Therefore, in addition to the effect of the foregoing arrangement, when a display device with high definition is used, RGB can easily substitute for luminance Y, red color difference Cr and blue color difference Cb.

Further, in addition to the arrangement, in the data conversion device according to the present invention, the data conversion section performs the data conversion process using data having been subjected to the compression process and the restoration process also with respect to the display data of the present frame.

With the arrangement, the data conversion section performs the data conversion process using data having been subjected to the compression process and the restoration process also with respect to the display data of the present frame. As a result, deviation of information due to the compression process can be reduced, between display data of a past frame (e.g. a frame previous by one frame) and display data of a present frame used for the data conversion. Therefore, in addition to the effect of the foregoing arrangement, the decrease in display quality due to compression (reduction) of display data can be suppressed more effectively.

Further, in addition to the arrangement, in the data conversion device according to the present invention, the data conversion section compares display data of a frame previous by one frame with the display data of the present frame, and when a difference between the display data of the frame previous by one frame and the display data of the present frame is equal to or smaller than a predetermined value, the data conversion section outputs the display data of the present frame as the output display data without performing data conversion using display data compressed by the compressing section.

With the arrangement, display data of a frame previous by one frame is compared with the display data of the present frame, and when the difference between the two data is equal to or smaller than a predetermined value, the display data of the present frame is output as it is without performing data conversion using display data compressed by the compressing section.

As a result, in addition to the effect of the foregoing arrangement, unnecessary compression is not carried out in a case of a frozen (still) image in which data of a frame previous by one frame is the same as data of a present frame, so that the color deviation of a frozen image is suppressed effectively.

Further, in addition to the arrangement, in the data conversion device according to the present invention, the data conversion section performs the data conversion process in an overdrive mode driving.

With the arrangement, the conversion in the overdrive mode driving is performed as the data conversion process. As a result, in addition to the effect of the foregoing arrangement, the conversion in the overdrive mode driving is favorably performed.

Further, in addition to the arrangement, in the data conversion device according to the present invention, the data conversion section compares, as the data conversion process, luminance of display data of a frame previous by one frame with luminance of the display data of the present frame, and when a difference in luminance between the display data of the frame previous by one frame and the display data of the present frame is equal to or larger than a predetermined value, the data conversion section generates, as the calculation data, low luminance data indicative of darker luminance than darker one of (i) the luminance of the display data of the frame previous by one frame and (ii) the luminance of the display data of the present frame while changing from the luminance of the frame previous by one frame to the luminance of the present frame.

With the arrangement, the luminance of display data of the frame previous by one frame is compared with the luminance of display data of the present frame, and when the difference in luminance between two data is equal to or larger than a predetermined value, low luminance data indicative of darker luminance than darker one of (i) the luminance of the display data of the frame previous by one frame and (ii) the luminance of the display data of the present frame is generated as the calculation data while changing from the luminance of the frame previous by one frame to the luminance of the present frame.

There is a case in which a screen with almost the same luminance has continued for a long time and suddenly the luminance changes greatly. For example, there is a case in which an image of night has been displayed for a long time and then an image of day is displayed suddenly. On the other hand, there is a case in which an image of day has been displayed for a long time and then an image of night is displayed suddenly. In a case shown by the former, in which luminance of display data of a frame previous by one frame is dark and luminance of display data of a present frame is bright, when the difference in luminance between the two data is equal to or larger than a predetermined value, display data indicative of darker luminance than the luminance of the frame previous by one frame is generated while changing from the luminance of the frame previous by one frame to the luminance of the present frame. In a case shown by the latter, in which luminance of display data of a frame previous by one frame is bright and luminance of display data of a present frame is dark, when the difference in luminance between the two data is equal to or larger than a predetermined value, display data indicative of darker luminance than the luminance of the present frame is generated while changing from the luminance of the frame previous by one frame to the luminance of the present frame.

For example, the display data of the frame previous by one frame is replaced with thus generated data. Alternatively, for example, the display data of the present frame is replaced with thus generated data.

Therefore, in addition to the effect of the foregoing arrangement, an after-image sensed by human eyes can be reduced.

Further, in addition to the arrangement, in the data conversion device according to the present invention, the low luminance data is indicative of luminance brighter than black.

With the arrangement, the low luminance data is indicative of luminance brighter than black. As a result, in addition to the effect of the foregoing arrangement, a decrease in a time-average of luminance can be mitigated.

Further, in addition to the arrangement, in the data conversion device according to the present invention, the data conversion section inserts the calculation data between display data of a frame previous by one frame and the display data of the present frame as the data conversion process, so as to convert original display data into display data whose frame frequency is twice as large as that of the original display data.

With the arrangement, by using the display data of the frame previous by one frame and the display data of the present frame, the calculation data is inserted between the two data, so that the original display data is converted into the display data whose frame frequency is twice as large as that of the original display data. As a result, in addition to the effect of the foregoing arrangement, it is possible to easily double the frame frequency.

For a fuller understanding of the nature and advantages of the invention, reference should be made to the ensuing detailed description taken in conjunction with the accompanying drawings.

DESCRIPTION OF THE EMBODIMENTS

First Embodiment

An embodiment of the present invention is explained below with reference to FIG. 1.

Figure 1:
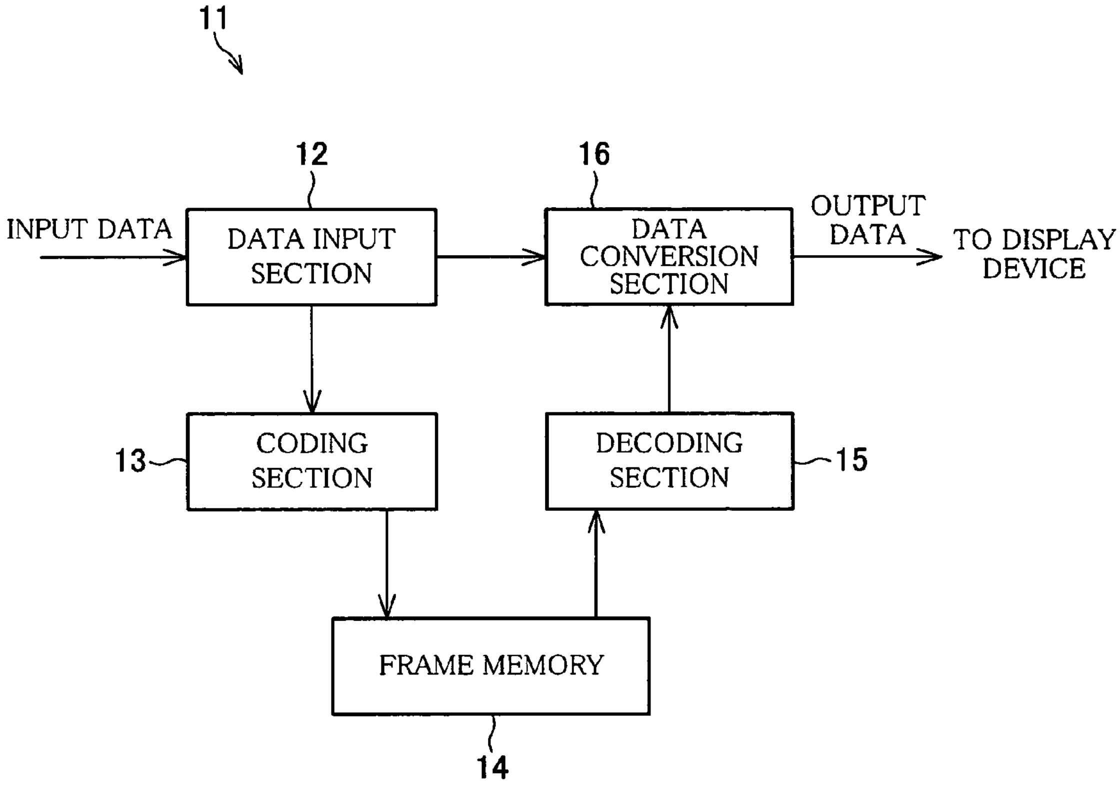
FIG. 1 is a block diagram illustrating a main structure of a data conversion device of the present invention.

As illustrated in FIG. 1, a data conversion device 11 of the present embodiment is a coding and decoding device for performing a data conversion in response to display data inputted from the outside and outputting the output display data to a display device such as a liquid crystal display device. The data conversion device 11 includes a data input section 12, a coding section (compressing section) 13, a frame memory 14, a decoding section (restoring section) 15, and a data conversion section 16.

The data input section 12 receives display data inputted to the data conversion device 11, and sends the data to the coding section 13 and the data conversion section 16.

The coding section 13 changes (codes) the display data such as gradation data into compressed data constituted of luminance Y and color difference signals that are components of the display data. In coding data, the present embodiment performs a compression process for reducing the amount of data by performing adjustment between display data in an n-th frame (image) and surrounding display data, and outputs thus obtained data (compressed data) so as to store the data in the frame memory 14. Alternatively, the present embodiment may be arranged so as to perform a compressing process of RGB data and output the compressed data. The compression process is explained later in detail.

"Coding" in the present embodiment means converting gradation data into luminance and color differences and then changing them into compressed data, or means changing RGB data into compressed data, and "decoding" is the opposite thereof. Further, "compression" in the present embodiment means replacing the same components of display data owned by a plurality of pixels with a single set of data which corresponds to their average value regarded as "an alternative value", so as to reduce (thin out, size down) the amount of data. "Restoration" is the opposite thereof, and means assigning one average value to each of two pixels, so as to restore the amount of data to a previous state.

The alternative value is calculated by adding a component of each pixel and a component of a pixel existing around the foregoing pixel on a screen, with both the components weighted. Here, the weight is 1:1, and the alternative value becomes an average value of the both.

The frame memory 14 stores display data by one frame (image) and memorizes the compressed data.

The decoding section 15 restores (decodes) the compressed data memorized by the frame memory 14 to display data in a previous state. Namely, the decoding section 15 reads out from the frame memory 14 the compressed data of one or more frames that are ahead of the n-th frame (n is a natural number) and restores the compressed data to the display data in the previous state.

The data conversion section 16 performs a data conversion for producing display data in the n-th frame, on the basis of display data in the n-th frame inputted from the outside and of display data of one or more frames being ahead of the n-th frame, temporarily stored in the frame memory 14, and outputs the display data in the n-th frame to the display device. "Data conversion" means generation or modification (processing) performed with respect to the display data so as to improve the display ability of the display device, such as overdrive mode driving or overshoot mode driving (referred to as overdrive mode driving hereinafter).

In the case of performing a data conversion process between frames, it is necessary to temporarily reserve display data of at least one frame. This data conversion process needs a large hardware size because the display data of one frame is large. Therefore, it is conceivable that reduction of the display data reserved in the memory allows the hardware to be smaller.

Thus, the compression of the display data is carried out. Note that, the data conversion process compares display data of a frame previous by one frame with display data of a present frame, so that simple compression just like general compression of an image generates a pattern in which deviation is easy to be recognized by human eyes in comparison.

Namely, images have continuity, and when the images have a pattern indicative of great deviation, the deviation is seen in a wide range of the screen. Namely, in general, pixels adjoining each other in one image (one frame) are apt to have the same color. Therefore, when one pixel has a pattern indicative of great deviation, a pixel next to it or a pixel next but one to it also has such "a pattern indicative of great deviation". Therefore, a color deviation is seen in a wide range of the screen.

The constant generation of deviation is caused by a pattern in which: when data of a frame previous by one frame and data of a present frame are compared, present frame data of one color (e.g. red) is smaller than one-frame-previous data of the color, and present frame data of another color (e.g. blue) is larger than one-frame-previous data of the another color. In this case, a direction of the deviation varies according to colors. In this case, the overdrive mode driving adopted while making a usual compression causes a color to deviate greatly compared with an image of a present frame in a case when it is not compressed. In this example, the data of a present frame gained through a data conversion process has smaller deviation of red color and larger deviation of blue color than the original data of a present frame. As a result, the image of the present frame becomes more bluish than the original color.

As described above, the conventional general data compression reduces a spatially high frequency component, but the same operation performed with respect to the data of a previous frame of the overdrive mode driving brings about a noise of a high frequency component.

In order to avoid generation of such a noise, the present embodiment complements a result of compression (thinning out) on a screen in a spatial manner, that is, by use of data of another pixel in the same frame. As just described, the present embodiment averages the display data among circumference, and therefore never increases a noise.

However, a resolving ability (resolution) of human eyes is more sensitive to luminance than to chromaticity, so that unless each pixel has information of luminance, deviation is apt to be seen by human eyes. Therefore, chromaticity (a color difference is used in the present embodiment), for which spatial resolving ability of human eyes is lower than for luminance, is averaged among circumference, thereby reducing the amount of data. Namely, the resolving ability of human eyes is inferior in chromaticity than in luminance. By using this characteristic, information of chromaticity of adjoining pixels is averaged, so that the compression is carried out while the display data is preserved. The actual experiment of overdrive mode driving by use of VGA of 20 type brought a good result.

In a case of performing a compression process with respect to RGB data, concretely, an average value of sub pixels of the same color included in adjoining pixels may be preserved. Note that green color with high luminance should be preserved by each pixel. As a result, data of 48 bits corresponding to two pixels each of which includes three 8-bit components are reduced to 32 bits. Namely, in a case of not performing the compression, green, red and blue of sub pixels included in a pixel are respectively 8 bits, and green, red and blue of sub pixels included in a pixel adjoining the pixel are also respectively 8 bits, and accordingly the sum is 8 bits×6=48 bits. But as a compression (thinning out, reduction) process, as for red, instead of the color itself (8+8=16 bits) being memorized, an average value between adjoining pixels (8 bits) is memorized. The same way is applied to blue. As a result, "green" is 8 bits×2, "an average of red" is 8 bits, "an average of blue" is 8 bits, and they add up to 32 bits. And decoding is carried out based on data of the 32 bits.

Note that the reduction effect of the number of such necessary bits is the same as when luminance Y, red color difference Cr, and blue color difference Cb are used, and data of 48 bits corresponding to two pixels each of which includes three 8-bit components can be reduced to 32 bits.

Note that out of RGB, G occupies 60% of luminance, and therefore, when the size of a pixel is small, namely, when a module with high definition is used, RGB can substitute for luminance Y, red color difference Cr, and blue color difference Cb. But when a module without high definition is used, it is preferable to convert data into information of luminance and chromaticity (a color difference) and then to average the data of chromaticity between two pixels, because it is possible to obtain a high compression ratio while suppressing the decrease in display quality, even if the condition of realizing a high-definition module is not satisfied, compared with the case of RGB.

The following explains a case of a compression process performed after data is temporarily converted into the information of luminance and chromaticity.

The coding section 13 changes (codes) display data into luminance Y and color difference signals Cr and Cb ($Y_8$, $Cr_8$, $Cb_8$ here).

$$Y_8(n_{8R}, n_{8G}, n_{8B})=0.2986L_8(n_{8R})+0.587149L_8(n_{8G})+0.114251L_8(n_{8B})$$

$$Cr_8(n_{8R}, n_{8G}, n_{8B})=0.500285L_8(n_{8R})-0.41879L_8(n_{8G})-0.08149L_8(n_{8B})$$

$$Cb_8(n_{8R}, n_{8G}, n_{8B})=-0.16842L_8(n_{8R})-0.33116L_8(n_{8G})+0.499577L_8(n_{8B})$$

Here, $n_{8R}$ means gradation of red, $n_{8G}$ means gradation of green, $n_{8B}$ means gradation of blue, and $L_8$ ( ) means gradation luminance characteristics.

Pixels in a horizontal direction are numbered 1, 2, . . . , N sequentially from the left side, and the numerical order of a target pixel is set as x, luminance and color difference signals of each pixel are set as luminance Y (x), red color difference Cr (x), and blue color difference Cb (x). Here, display data is averaged between pixels adjoining in a horizontal direction, namely, between each pixel (number=x) and a pixel on the immediate left side of the pixel (number=x−1).

In order to average the amount of transferred data in one pixel, data to be transferred in a pixel of an even number and in a pixel of an odd number are set as follows. Namely, in a pixel of an even number, luminance $Y(x)$ an average of red color difference (set as $Ar$)$\{Cr(x-1)+Cr(x)\}/2$ are transferred. And in a pixel of an odd number, luminance $Y(x-1)$ an average of blue color difference (set as $Ab$)$\{Cb(x-1)+Cb(x)\}/2$ are transferred. The reason to do so is that, transferring Y (x), the average of Cr and the average of Cb in one pixel and transferring only Y (x) in a pixel next to it makes the amount of data inconsistent.

In this way, as to two pixels, six components of display data, such as Y (x−1), Y (x), Cr (x−1), Cr (x), Cb (x−1) and Cb (x) (when each component is 8 bits, the sum is 48 bits), are compressed (reduced, sized down) into four components such as Y (x−1), Y (x), Ar and Ab (when each component is 8 bits, the sum is 32 bits).

The coding section 13 writes the above data in the frame memory 14 by each pixel. The frame memory 14 reserves the data sent from the coding section 13 and sends the data to the decoding section 15 one frame later.

The decoding section 15 reads out the data from the frame memory 14 and carries out the opposite process of the coding section 13. Namely, the four data such as Y (x−1), Y (x), Ar and Ab are changed (restored) into a pair of Y (x−1), Ar and Ab and a pair of Y (x), Ar and Ab respectively for two pixels. And the compressed data is restored (decoded) to data of luminance (L (n)) by each color. Note that there is only one data for Cr and Cb (average value) in two pixels, and therefore the data is used in two pixels. Decoded data is sent to the data conversion section 16.

The data conversion section 16 is a block for performing a data conversion process between frames, such as overdrive mode driving. However, the data conversion section 16 always compares display data of a present frame with display data of a frame previous by one frame, and when the difference between the two data is equal to or smaller than a predetermined value, the data conversion section 16 judges the two frames to be frozen (still) images, and outputs the display data of a present frame as it is without coding and decoding data nor without performing the compression and restoration. An example is a case where a present frame and a frame previous by one frame have the same or substantially the same image.

Note that this compression process is carried out in a horizontal direction, but it may also be carried out in a vertical direction. Namely, in the present embodiment, display data is averaged between pixels adjoining right and left, but display data may also be averaged between pixels adjoining above and below. Further, in the present embodiment, an average value is calculated between two pixels, but it may also be calculated among three pixels or more.

Further, in the present embodiment, averaging, namely, a weight is 1:1, but it may also be set as numerical values other than 1:1, such as 1:2. In general, when a weight is set as (k−1):k, an alternative value is as follows.

Alternative value of red color difference $(k-1)Cr(x-1)+kCr(x)$

Alternative value of blue color difference $(k-1)Cb(x-1)+kCb(x)$

Here, 0≦k≦1. For example, when 0<k<1, the alternative value is an intermediate value between both of them. When k=0 or 1, the alternative value equals to a value possessed by one of the two pixels. When k=½, the alternative value is an average value, and in this case, weights of both pixels become equal to each other, so that the arrangement is simplified. The value of k can be set arbitrarily in designing the data conversion device.

Further, as described above, when a module with high definition is used, this data conversion process may be carried out with G, R and B instead of Y, Cr, and Cb.

Note that as described above, the coding section 13 performs a conversion process into luminance Y, color difference signals Cr, and Cb, or a conversion (compression) process into (Cr (x)+Cr (x−1))/2, and such a coding section 13 can easily be fabricated with ASIC (Application Specific IC). Namely, because the equation is constituted of LUT (Look Up Table) reference, addition, subtraction, and multiplication, and bit shift calculation, it can be easily realized with logic. Further, elemental devices other than a coding section 13 can also easily be fabricated with publicly known techniques.

In the present embodiment, the number of input/output pins necessary for accessing a memory in the overdrive mode driving is reduced, and accordingly small package can be used, so that the whole cost is lowered. Further, the amount of a necessary frame memory is also reduced, so that the data conversion device can be fabricated in a low price. Particularly, the number of ports for input/output of a multipurpose memory is the power of 2 such as 8 bits, 16 bits and 32 bits, so that reduction from 48 bits to 32 bits generates a great merit.

As described above, the data conversion section 16 performs a data conversion process such as overdrive mode driving and at the same time, when the difference between data of a present frame and data of a frame previous by one frame is equal to or smaller than a predetermined value, judges the two frames to be frozen images, and outputs the data of a present frame without modification. Namely, the present embodiment uses human characteristics that recognition of a moving image is more difficult than recognition of a frozen image, and therefore in the case of a frozen image, does not use coded and decoded data as present frame data, but outputs present frame data separately. Namely, due to non-linearity of a data conversion process between frames, in a case of the overdrive mode driving, when data of a present frame is the same as that of a frame previous by one frame, there is no change in data and therefore it is necessary to output the data of a present frame without modification. However, in a case where the overdrive mode driving process is always carried out regardless of data contents, when there is a difference between compressed data of a frame previous by one frame and compressed data of a present frame in data reduction by compression, an unnecessary data conversion process is carried out accordingly. Therefore, in the case of a frozen image, the present embodiment does not use coded and decoded data as present frame data, but outputs present frame data separately.

Second Embodiment

Another embodiment of the present invention is explained below with reference to FIG. 2. Note that for convenience of explanation, members having the same functions as those already described in the figure of the above embodiment are given the same signs and explanations thereof are omitted here.

Figure 2:
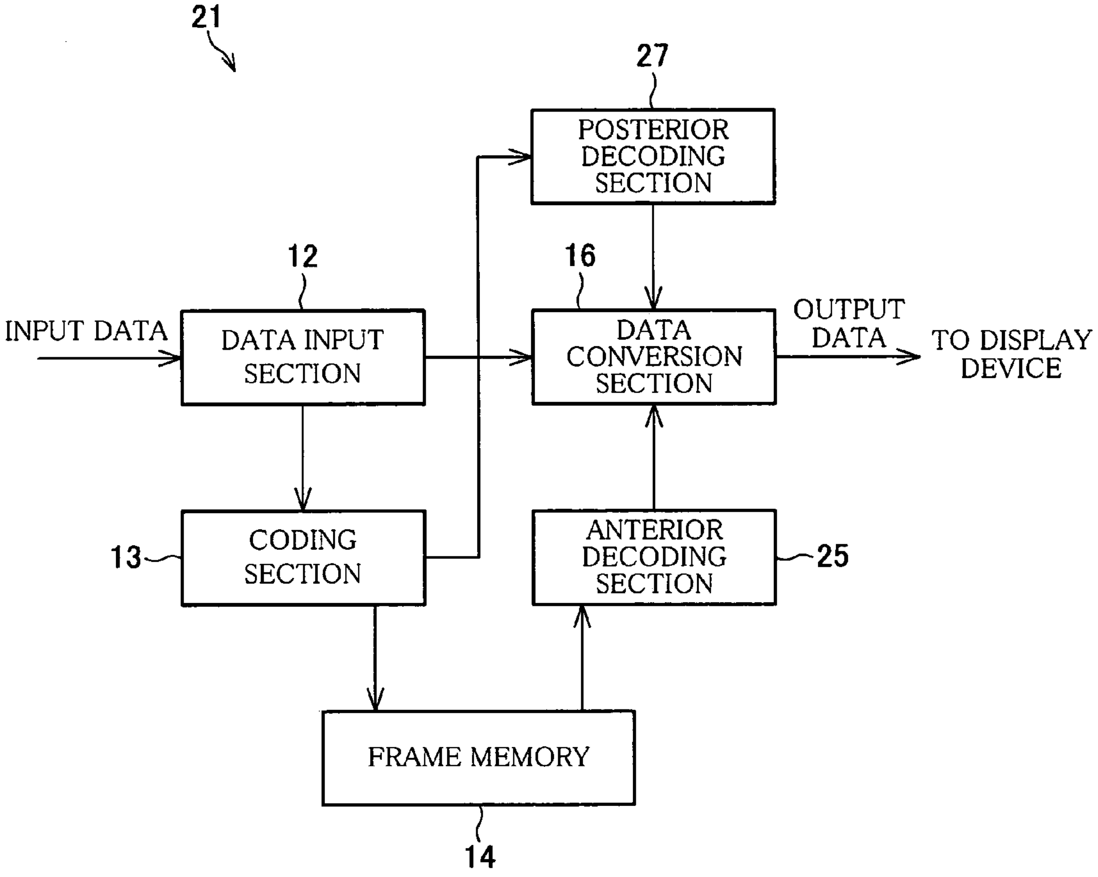
FIG. 2 is a block diagram illustrating a main structure of a data conversion device of the present invention.

As shown in FIG. 2, a data conversion device 11 of the present embodiment is a coding and decoding device for carrying out a data conversion in response to display data which is inputted from the outside, and for outputting the data to a display device such as a liquid crystal display device. The data conversion device 11 includes a data input section 12, a coding section (compressing section) 13, a frame memory 14, an anterior decoding section (restoring section) 25, a data conversion section 16, and a posterior decoding section (restoring section) 27. The functions of the data input section 12, the coding section 13, the frame memory 14, and the data conversion section 16 are the same as corresponding elemental devices of the first embodiment.

The function of the anterior decoding section 25 is the same as the decoding section 15 of the first embodiment.

After display data of a present frame is coded, the posterior decoding section 27 decodes the display data of a present frame in the same timing as display data of a frame previous by one frame read out from the frame memory 14 is decoded in the anterior decoding section 25.

The coding section 13 codes display data according to the same equation as the first embodiment.

The coding section 13 writes the coded data in the frame memory 14 by each pixel, and at the same time sends the data to the anterior decoding section 25. Further, the coding section 13 also sends the data to the posterior decoding section 27 without writing the data in the frame memory 14.

The frame memory 14 reserves the data sent from the coding section 13, and sends the data to the anterior decoding section 25 one frame after.

The anterior decoding section 25 reads out the compressed data from the frame memory 14, and performs the opposite process of the coding section 13. Note that there are only one Cr and only one Cb in each two pixels, so that the Cr and the Cb are used in both two pixels. Decoded data is sent to the data conversion section 16. The posterior decoding section 27 receives the compressed data from the coding section 13, and performs the opposite process of the coding section 13. Note that there are only one Cr and only one Cb in each two pixels, so that the Cr and the Cb are used in both two pixels. The decoded data is sent to the data conversion section 16.

The posterior decoding section 27 performs the opposite process of the coding section 13 on the basis of the data sent from the coding section 13. Note that there are only one Cr and only one Cb in each two pixels, so that the Cr and the Cb are used in both two pixels. The decoded data is sent to the data conversion section 16.

The data conversion section 16 performs a data conversion process in the same manner as the first embodiment. When the difference between data of a present frame and data of a frame previous by one frame is equal to or smaller than a predetermined value, the frames are judged to be frozen images, and the data of a present frame is outputted without modification. For this process, a route for directly inputting data from the data input section 12 to the data conversion section 16 is provided.

Note that this compression process is carried out in a horizontal direction, but it may also be carried out in a vertical direction. Namely, display data is averaged between pixels adjoining right and left, but display data may also be averaged between pixels adjoining above and below. Further, in the present embodiment, an average value is calculated between two pixels, but it may also be calculated among three pixels or more.

Further, the process of putting a weight is the same as the first embodiment and so explanation thereof is omitted here.

As described above, unlike the first embodiment, in order to reduce deviation of information between data of a present frame and data of a frame previous by one frame, the present embodiment uses compressed and restored data as present frame data.

However, in the case of a frozen image, the present embodiment does not use compressed and restored data as present frame data, but outputs present frame data separately, just like the first embodiment.

Third Embodiment

Another embodiment of the present invention is explained below with reference to FIG. 3 and FIG. 4. Note that for convenience of explanation, members having the same functions as those already described in the figures of the above embodiments are given the same signs and explanations thereof are omitted here.

As a structure of the present embodiment, the arrangement shown in FIG. 1 or FIG. 2 can be used.

Every time a frame changes, luminance of each pixel (or each sub pixel) on a screen changes, and there may be a point where a sudden change occurs in luminance in changing a frame, namely, a point where luminance greatly changes and a point where luminance hardly changes. For example, there is a case where an image of night has been displayed for a long time and then an image of day is displayed suddenly, or on the other hand, there is a case where an image of day has been displayed for a long time and then an image of night is displayed suddenly.

Figure 3:
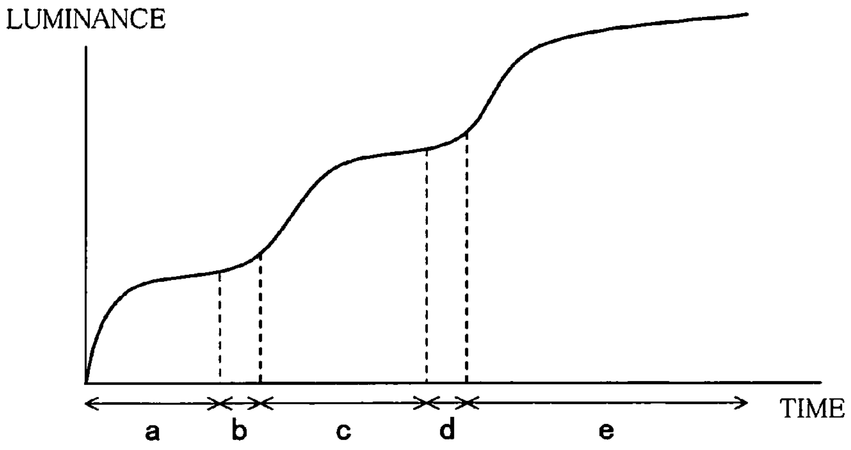
FIG. 3 is a graph illustrating time-transition of luminance.

FIG. 3 illustrates an example of time-transition of luminance in one pixel (or one sub pixel). In the figure, after a time when luminance hardly changes (zone "a" in the figure) continues for some time, luminance rises suddenly (zone "b" in the figure), and after a time when luminance hardly changes (zone "c" in the figure) continues for some time again, luminance rises suddenly again (zone "d" in the figure), and then a time when luminance hardly changes (zone "e" in the figure) continues. Note that, in fact, luminance is invariable in a displaying time of each frame, but here the time is considered as a point, and each point is connected by a line.

In such a case, in the zone "b" or "d" where the change of luminance is sudden, human eyes may feel an after-image. In order to reduce this disadvantage, as illustrated in FIG. 4, in the present embodiment, the data conversion section 16 replaces display data in a changing point such as the zone "b" where luminance of a screen greatly changes, with black data serving as low luminance data. Alternatively, the data conversion section 16 replaces the display data with data whose luminance is brighter than black and darker than luminance of a darker part of the front and back parts of the replaced zone "b" (the zone "a" and the zone "c"), namely, in this case, luminance at the last point of the zone "a", in other words, luminance at a point just before the replaced zone "b".

In the same manner, display data of a changing point such as the zone "d" where luminance of the screen greatly changes is replaced with the black data. Alternatively, the display data is replaced with the data whose luminance is brighter than black and darker than luminance at a point just before the replaced zone "d".

Namely, examples thereof are the following three sections:

(a) One or more frame periods. Luminance is in a dark condition, or changes gradually.

(b) One or more frame periods next to (a). Luminance is getting bright suddenly.

(c) One or more frame periods next to (b). Luminance is in a bright condition, or changes gradually.

Further, (b) is replaced with low luminance data such as black data. Note that the number of frames to be replaced may be one or more.

In the present embodiment, such pseudo-impulse driving is performed.

In order to perform this process, the data conversion section 16 detects a change of data between frames. In performing the detection, it is necessary to refer to data of a previous frame, so that a compression/restoration process based on the arrangement shown in FIG. 1 or FIG. 2 is performed in a reserving process of this frame data.

Figure 4:
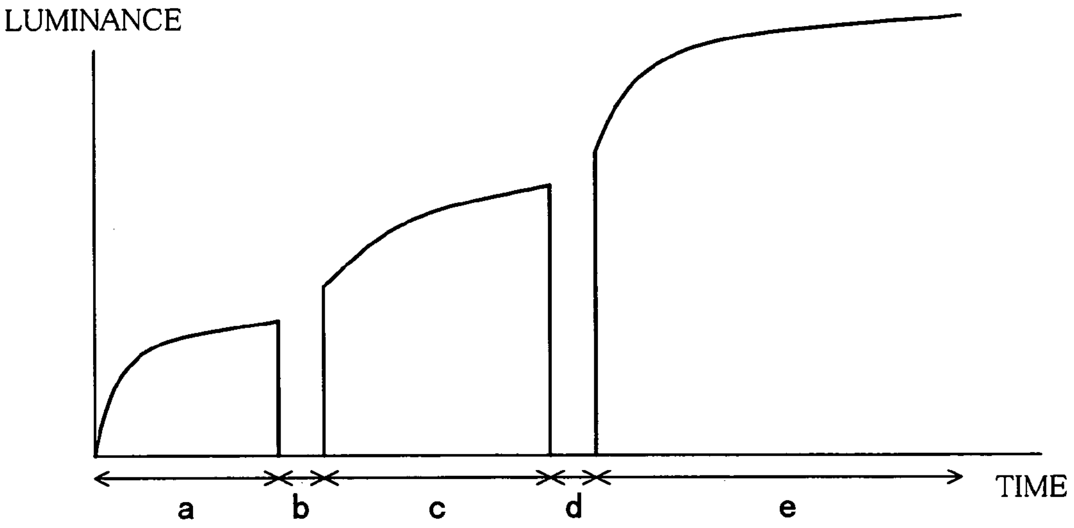
FIG. 4 is a graph illustrating time-transition of luminance.

Note that FIG. 3 and FIG. 4 illustrate an example of a case where luminance suddenly becomes bright, and the same manner may be applied to a case where luminance suddenly becomes dark. Also in this case, display data at a changing point where luminance of the screen changes greatly is replaced with black data. Alternatively, the display data at the changing point is replaced with data whose luminance is brighter than black and darker than luminance of a darker part of front and back parts of the replaced zone, in other words, luminance at a point just after the replaced zone.

Namely, the luminance of the replaced zone is set as black or as luminance that is brighter than black and darker than both luminance of a zone just before the replaced zone and luminance of a zone just after the replaced zone.

Further, in terms of luminance, insertion of black decreases a time-average of luminance. In order to prevent it, a dark half tone is used as the low luminance data, instead of black. The value of this half tone is determined so that there is a difference from the gradation of the previous frame in terms of luminance. As described above, when the luminance brighter than black is used as the low luminance data, the decrease in a time-average of luminance can be mitigated. In the reserving process of this frame data, the compression/restoration process based on the arrangement shown in FIG. 1 or FIG. 2 is performed. As a result, the amount of data necessary to be reserved can be reduced.

Fourth Embodiment

Figure 5:
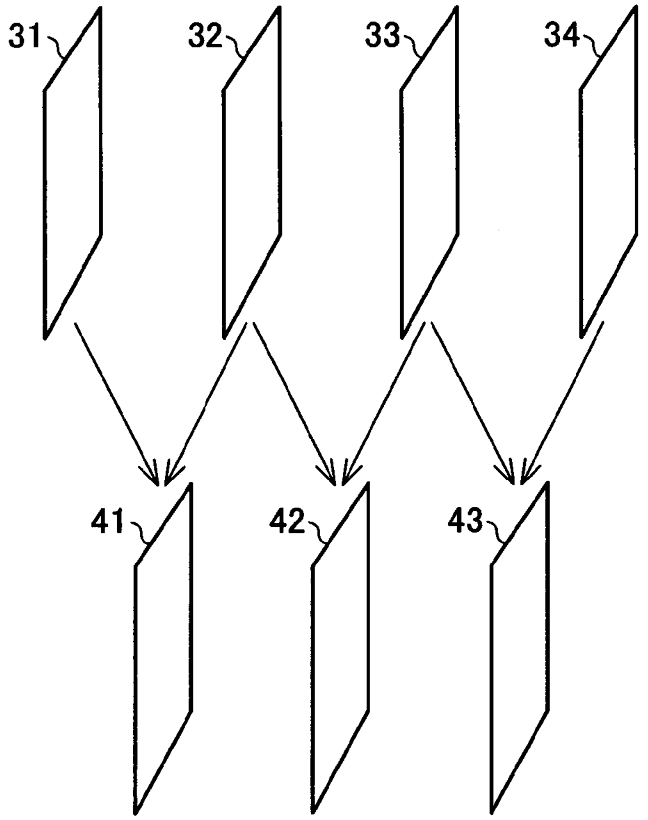
FIG. 5 illustrates how other frames are inserted between frames.

Another embodiment of the present invention is explained below with reference to FIG. 5. Note that for convenience of explanation, members having the same functions as those described in the figures of the above embodiments are given the same signs and explanations thereof are omitted here.

As an arrangement of the present embodiment, the arrangement shown in FIG. 1 or FIG. 2 can be used.

Frames 31, 32, 33 and 34 are original display data and are sequential. Namely, a frame transits from 31, 32, 33 and 34 with time. The frame frequency is set as 60 Hz for example.

Here, a process is performed, in which display data of 60 Hz in a frame frequency is converted into display data of 120 Hz in a frame frequency, being twice as large as the former.

In this case, frames twice as many as inputted frames are necessary in output. Thus, as illustrated in FIG. 5, the data conversion section 16 generates, using display data of sequential two frames, display data for a frame between the two frames. Namely, the data conversion section 16 generates, using the frames 31 and 32, a frame 41 to be inserted between the frames 31 and 32. In a similar way, the data conversion section 16 generates, using the frames 32 and 33, a frame 42 to be inserted between the frames 32 and 33. In a similar way, the data conversion section 16 generates, using the frames 33 and 34, a frame 43 to be inserted between the frames 33 and 34.

In order to perform this process, information of a previous frame is necessary, so that a compression/restoration process based on the arrangement shown in FIG. 1 or FIG. 2 is performed when a reserving process of information of this frame data is performed. For example, when the frame 41 is generated, the frame 31 is a previous frame and the frame 32 is a present frame, and so on. As a result, the amount of data necessary to be reserved can be reduced.

Figure 6:
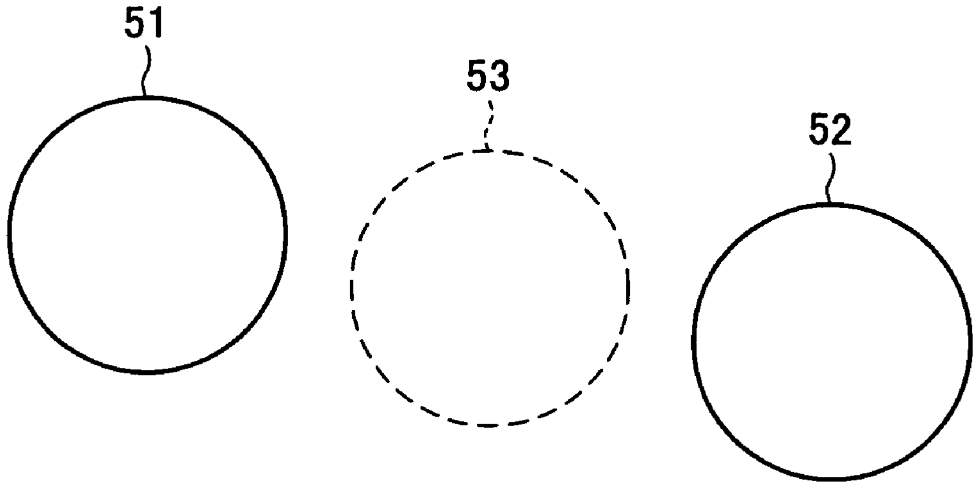
FIG. 6 illustrates how other intermediate frame is inserted between frames.

The display data for a frame between frames is not particularly limited. For example, in order to smoothen a movement of moving images, an edge of an image of a frame is detected and destination of the edge is inferred from a similarity of images between frames, so that a frame to be inserted in an intermediate position between sequential frames is generated. For example, as illustrated in FIG. 6, assuming that there are moving images in which circles 51 and 52 move. From positions of the circle 51 in an n-th frame and the circle 52 in an (n+1)th frame, an intermediate position between them is inferred, a frame having a circle 53 in the intermediate position is generated and inserted between the n-th frame and the (n+1)th frame, so that the movement of the moving images seems smooth.

The present invention is not limited to the above embodiments, and a variety of modifications are possible within the scope of the following claims, and embodiments obtained by combining technical means respectively disclosed in the above embodiments are also within the technical scope of the present invention.

Note that the present invention may be arranged so that the data conversion device (coding and decoding device) for outputting display data to a display device in response to display data from outside includes:

a memory for storing display data;

a data conversion section (data conversion means) for generating display data in an n-th (n is a natural number) frame and for outputting the display data to the display device, the display data being generated on the basis of (i) data in the n-th frame from the outside and (ii) data in one or more frames previous to the n-th frame, the data in one or more frames previous to the n-th frame being temporarily stored in the memory;

a coding section for performing adjustment between display data in the n-th frame and surrounding data so as to reduce the amount of data and for storing the display data in the n-th frame into the memory, a decoding section for reading out from the memory the data of said one or more frames previous to the n-th frame and for restoring the data to the display data in a previous state.

Further, in the arrangement, the present invention may be arranged so as to be a coding and decoding device for adjusting a coding device in a horizontal direction.

Further, in the arrangement, the present invention may be arranged so as to be a coding and decoding device for adjusting a coding device in a vertical direction.

Further, in the arrangement, the present invention may be arranged so as to be a coding and decoding device for converting the display data into information of luminance and chromaticity so as to code the information.

Further, in the arrangement, the present invention may be arranged so as to be a coding and decoding device for using once coded and decoded data as data of a present frame.

Further, in the arrangement, the present invention may be arranged so as to be a coding and decoding device which compares data of a frame previous by one frame with data of a present frame, and when a difference between two data is equal to or smaller than a predetermined value, outputs the data of the present frame without modification.

Further, in the arrangement, the present invention may be arranged so as to perform conversion of overdrive mode driving as the data conversion process.

Further, in the arrangement, the present invention may be arranged so as to insert, as the data conversion process, data whose gradation is darker than inputted data, on the basis of data of a previous frame, once in every n frames (n is an integer number being equal to 2 or more).

Further, in the arrangement, the present invention may be arranged so as to convert, as the data conversion process, inputted data into data whose frame frequency is twice as large as that of the inputted data.

Note that concrete embodiments in "DESCRIPTION OF THE EMBODIMENTS" are explained first and foremost to clarify technical contents of the present invention. The present invention is not limited to such concrete embodiments, and a variety of modifications are possible within the scope of the spirit of the present invention and within the scope of the below-indicated claims.

What is claimed is:

1. A data conversion device, which performs a data conversion process for causing a frame memory to memorize display data of a past frame and for causing a data conversion section to generate calculation data serving as display data of a frame after the past frame on a basis of the display data of the past frame and display data of a present frame, so as to output as output display data the calculation data to a display device, comprising:

a compressing section for outputting compressed data to be memorized in the frame memory for each frame, the compressed data having been subjected to a compression process by replacing one or more components constituting the display data of each pixel and other one or more components constituting display data of a pixel existing around that pixel on a screen with one or more alternative values calculated by adding said one or more components and said other one or more components to each other after these components have been weighted so as to reduce an amount of data; and a restoring section for outputting restored data to the data conversion section so that the restored data is to be converted, the restored data having been subjected to a restoration process by reading out the compressed data from the frame memory and allotting the alternative value as display data for each corresponding pixel.

2. The data conversion device as set forth in claim 1, wherein the calculation data is the output display data of the present frame.

3. The data conversion device as set forth in claim 1, wherein the alternative value is an average value between the component of each pixel and the other component of the pixel existing around that pixel on the screen.

4. The data conversion device as set forth in claim 1, wherein the components are respectively luminance Y, red color difference Cr, and blue color difference Cb, and the data conversion section replaces the red color difference Cr and the blue color difference Cb respectively with the alternative values.

5. The data conversion device as set forth in claim 1, wherein the components are respectively RGB, and the data conversion section replaces R and B respectively with the alternative values.

6. The data conversion device as set forth in claim 1, wherein the data conversion section performs the data conversion process using data having been subjected to the compression process and the restoration process also with respect to the display data of the present frame.

7. The data conversion device as set forth in claim 1, wherein the data conversion section compares display data of a frame previous by one frame with the display data of the present frame, and when a difference between the display data of the frame previous by one frame and the display data of the present frame is equal to or smaller than a predetermined value, the data conversion section outputs the display data of the present frame as the output display data without performing data conversion using display data compressed by the compressing section.

8. The data conversion device as set forth in claim 2, wherein the data conversion section performs the data conversion process in an overdrive mode driving.

9. The data conversion device as set forth in claim 1, wherein the data conversion section compares, as the data conversion process, luminance of display data of a frame previous by one frame with luminance of the display data of the present frame, and when a difference in luminance between the display data of the frame previous by one frame and the display data of the present frame is equal to or larger than a predetermined value, the data conversion section generates, as the calculation data, low luminance data indicative of darker luminance than darker one of (i) the luminance of the display data of the frame previous by one frame and (ii) the luminance of the display data of the present frame while changing from the luminance of the frame previous by one frame to the luminance of the present frame.

10. The data conversion device as set forth in claim 9, wherein the low luminance data is indicative of luminance brighter than black.

11. The data conversion device as set forth in claim 1, wherein the data conversion section inserts the calculation data between display data of a frame previous by one frame and the display data of the present frame as the data conversion process, so as to convert original display data into display data whose frame frequency is twice as large as that of the original display data.

* * * * *